United States Patent
Kaplan

(10) Patent No.: US 10,459,850 B2
(45) Date of Patent: Oct. 29, 2019

(54) SYSTEM AND METHOD FOR VIRTUALIZED PROCESS ISOLATION INCLUDING PREVENTING A KERNEL FROM ACCESSING USER ADDRESS SPACE

(71) Applicant: Advanced Micro Devices, Inc., Sunnyvale, CA (US)

(72) Inventor: David A. Kaplan, Austin, TX (US)

(73) Assignee: Advanced Micro Devices, Inc., Santa Clara, TX (US)

( * ) Notice: Subject to any disclaimer, the term of this patent is extended or adjusted under 35 U.S.C. 154(b) by 0 days.

(21) Appl. No.: 15/270,231

(22) Filed: Sep. 20, 2016

(65) Prior Publication Data

US 2018/0081829 A1    Mar. 22, 2018

(51) Int. Cl.
*G06F 12/14*    (2006.01)
*G06F 9/355*    (2018.01)
(Continued)

(52) U.S. Cl.
CPC ...... *G06F 12/1483* (2013.01); *G06F 9/45558* (2013.01); *G06F 12/1009* (2013.01);
(Continued)

(58) Field of Classification Search
CPC ............. G06F 12/1483; G06F 9/45558; G06F 12/1009; G06F 12/1408;
(Continued)

(56) References Cited

U.S. PATENT DOCUMENTS 6,889,296 B2 *  5/2005  Franaszek .............. G06F 12/023
                                                        711/155
7,209,994 B1 *  4/2007  Klaiber ............... G06F 9/45533
                                                        710/260
(Continued)

OTHER PUBLICATIONS

Xia et al, "Architecture Support for Guest-Transparent VM Protection from Untrusted Hypervisor and Physical Attacks," 2013 International Symposium on High Performance Computer Architecture (HPCA2013), Feb. 23-27, 2013, 12 pages.*

(Continued)

*Primary Examiner* — Glenn Gossage
(74) *Attorney, Agent, or Firm* — Meyertons Hood Kivlin Kowert and Goetzel PC; Rory D. Rankin

(57) ABSTRACT

Systems, apparatuses, and methods for implementing virtualized process isolation are disclosed. A system includes a kernel and multiple guest virtual machines (VMs) executing on the system's processing hardware. Each guest VM includes a vShim layer for managing kernel accesses to user space and guest accesses to kernel space. The vShim layer also maintains a set of page tables separate from the kernel page tables. In one embodiment, data in the user space is encrypted and the kernel goes through the vShim layer to access user space data. When the kernel attempts to access a user space address, the kernel exits and the vShim layer is launched to process the request. If the kernel has permission to access the user space address, the vShim layer copies the data to a region in kernel space and then returns execution to the kernel. The vShim layer prevents the kernel from (Continued)

accessing the user space address if the kernel does not have permission to access the user space address. In one embodiment, the kernel space is unencrypted and the user space is encrypted. A state of a guest VM and the vShim layer may be stored in virtual machine control blocks (VMCBs) when exiting the guest VM or vShim layer.

20 Claims, 10 Drawing Sheets

(51) Int. Cl.
    *G06F 12/1009*     (2016.01)
    *G06F 9/455*     (2018.01)
    *G06F 21/62*     (2013.01)

(52) U.S. Cl.
    CPC ...... *G06F 12/1408* (2013.01); *G06F 21/6281* (2013.01); *G06F 2009/45583* (2013.01); *G06F 2009/45587* (2013.01); *G06F 2212/1052* (2013.01); *G06F 2212/152* (2013.01); *G06F 2212/402* (2013.01)

(58) Field of Classification Search
    CPC . G06F 2009/45583; G06F 2009/45591; G06F 2212/1052; G06F 2212/152; G06F 2212/402
    See application file for complete search history.

(56) References Cited

U.S. PATENT DOCUMENTS

| | | | |
|---|---|---|---|
| 2011/0047543 A1* | 2/2011 | Mohinder | G06F 12/145 718/1 |
| 2012/0054486 A1* | 3/2012 | Lakkavalli | G06F 21/57 713/156 |
| 2013/0031291 A1* | 1/2013 | Edwards | G06F 21/554 711/6 |
| 2015/0248357 A1* | 9/2015 | Kaplan | G06F 12/1408 713/193 |
| 2015/0371042 A1* | 12/2015 | Mooring | G06F 9/45545 726/1 |
| 2018/0357093 A1* | 12/2018 | Cong | G06F 21/602 |

OTHER PUBLICATIONS

AMD, Inc. White Paper entitled, "AMD-V Nested Paging," Revision 1.0, Jul. 2008, 19 pages.*

AMD, Inc., "Secure Virtual Machine Architecture Reference Manual," Publication No. 33047, Revision 3.01, May 2005, (approx.) 124 pages.*

Belay, et al., "Dune: Safe User-level Access to Privileged CPU Features", Proceedings of the 10th USENIX conference on Operating Systems Design and Implementation, Oct. 8, 2012, pp. 1-14, USENIX Association, Berkeley, CA, USA.

Kaplan et al., "AMD Memory Encryption", White Paper, Apr. 21, 2016, 12 pages, Advanced Micro Devices, Inc.

* cited by examiner

SYSTEM AND METHOD FOR VIRTUALIZED PROCESS ISOLATION INCLUDING PREVENTING A KERNEL FROM ACCESSING USER ADDRESS SPACE

BACKGROUND

Description of the Related Art

Virtualization is used in computer systems for a variety of different purposes. Generally, virtualization of a processor or computer system can include providing one or more privileged programs with access to a virtual machine over which the privileged program has full control, but the control of the physical machine is retained by a virtual machine manager (VMM) (which may also be referred to as a "hypervisor" or "kernel" herein).

Privileged programs can include operating systems, and can also include other software which expects to have full control of the hardware on which the software is executing. The virtual machine can include a processor (or processors), memory, and various peripheral devices that the privileged program expects to find in the machine on which it is executing. The virtual machine elements can be implemented by hardware that the hypervisor allocates to the virtual machine, at least temporarily, and/or can be emulated in software. Each privileged program (and related software in some cases, such as the applications that execute on an operating system) can be referred to herein as a guest, a user process, or a user application.

In a typical computing environment, there can be many processes or threads running on the physical hardware of a single physical system. For a typical process, the kernel manages the resources and scheduling of the process during execution. In addition, the kernel generally has full access to the memory of the system and can access any process's memory at any time without restriction. Consequently, by compromising the kernel, a malicious user can access the memory contents of other processes.

In addition to the above, in a common virtualization implementation, the hypervisor is considered fully trusted. Accordingly, the hypervisor has visibility into all of the guest's memory contents, register contents, etc. However, in some scenarios, it may be desired to prevent the hypervisor from having complete access to guest data.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
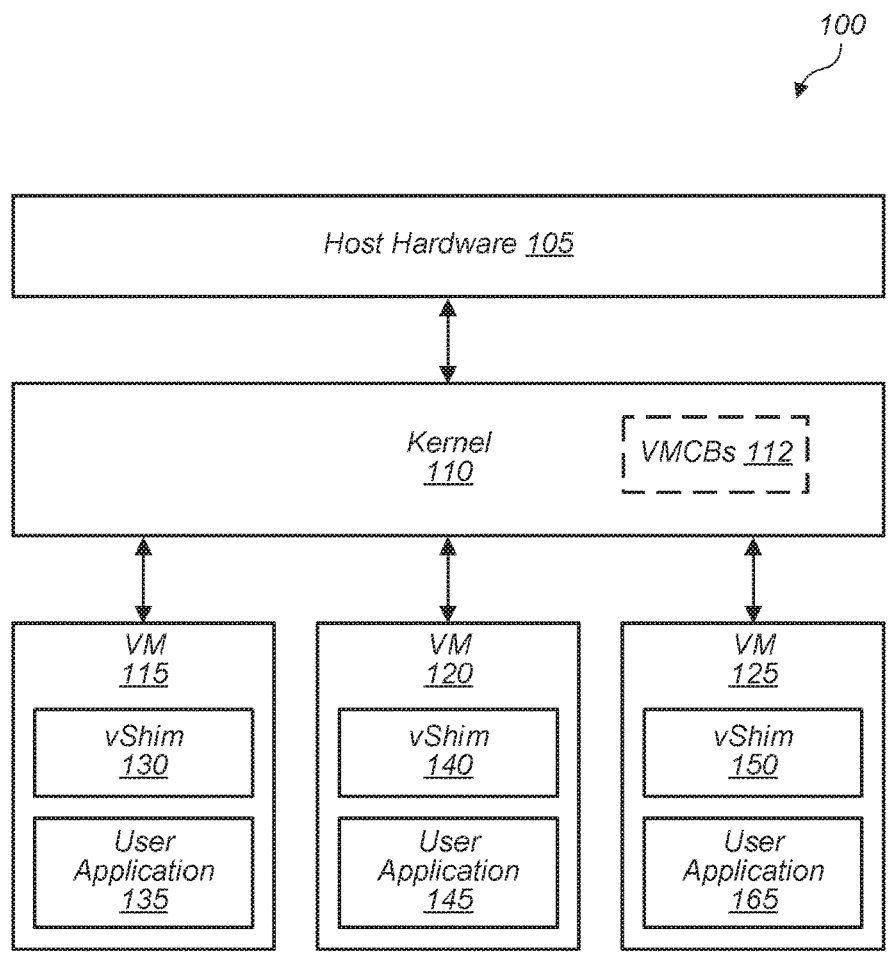
FIG. 1 is a block diagram of one embodiment of a computer system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, methods, and computer-readable mediums for performing virtualized process isolation are disclosed herein. In one embodiment, a system includes a kernel and multiple user processes within multiple guest virtual machines (VMs) executing on the system's processing hardware. In various embodiments, the kernel includes a virtual machine monitor (VMM) or hypervisor. Additionally, each guest VM includes a virtual shim ("vShim") layer for processing kernel accesses to user space and for processing guest accesses to kernel space. In one embodiment, the vShim layer maintains a separate set of page tables to map guest virtual addresses to guest physical addresses. The vShim layer page tables are an identity map for user space addresses while mapping kernel space addresses to an appropriate mirror region. The kernel also maintains a set of page tables to map guest physical addresses to host physical addresses.

In one embodiment, a processor of the system detects a request by the kernel to access a first address in user space. In one embodiment, for the kernel to access a memory region in user space, the kernel invokes a function to launch the vShim layer. In response to detecting the request, the processor of the system causes an exit from the kernel and launches the vShim layer to process the request. In one embodiment, the data stored at the first address is encrypted. The vShim layer checks to make sure the kernel has permission to access the first address. If the kernel does not have permission to access the first address, then the vShim layer is configured to prevent the kernel from accessing the first address. If the kernel has permission to access the first address, then the vShim layer is configured to copy data from the first address to a second address in kernel space.

In one embodiment, the vShim layer is configured to copy a code page into user space. In response to the code page being copied into user space, the vShim layer computes a hash value of the contents of the code page. If the computed hash value is on a whitelist of trusted hashes, then the vShim layer keeps the code page in the user space and allows the code page to be executed by a user application. Otherwise, if the computed hash value is not on the whitelist of trusted hashes, the vShim layer deallocates the code page.

Referring now to FIG. 1, a block diagram of one embodiment of a computer system architecture 100 is shown. As shown in FIG. 1, kernel 110 and virtual machines (VMs)

115, 120, and 125 are included in computer system architecture 100. Computer system architecture 100 may also be referred to herein as computer system 100. It is noted that kernel 110 can also be referred to as an "operating system kernel". VMs 115, 120, and 125 are representative of any number and type of VMs. Although multiple VMs can share the physical resources of one computing system, the VMs can be isolated from one another like different physical computers. It is noted that VMs 115, 120, and 125 can also be referred to as containers. In one embodiment, a Linux® operating system environment is utilized for computer system architecture 100. In other embodiments, computer system architecture 100 can be utilized with other types of operating systems. It should be understood that while some of the methods and mechanisms described in this disclosure are based on the Linux® operating system, the methods and mechanisms are not limited to Linux® environments. In other words, the methods and mechanisms described herein can be utilized with any type of operating system or computing system architecture. It should also be understood that it is possible that only a subset of user applications in a system are run using the VPI technology. Accordingly, some user applications can be run natively under the kernel, while other applications use the VM with vShim layer architecture described herein.

As shown in FIG. 1, each VM 115, 120, and 125 includes a vShim layer 130, 140, and 150, respectively. It is noted that each vShim layer can also be referred to herein as a "vShim application", "vShim layer", "monitoring application", or a "monitoring layer". It is also noted that the terms "vShim", "monitor", and "monitoring" can be used interchangeably herein. In one embodiment, a vShim layer is code which is added to a VM. In other embodiments, a vShim layer can be any combination of hardware and/or software which is located within one or more components of a computing system. Generally speaking, the vShim layer is configured to intercept requests originating from the kernel that target the VM. The vShim layer can also intercept requests originating from the VM that target the kernel. Additionally, the vShim layer provides a number of entry points for various services. Such services can include reading/writing user memory, copying page tables, sending signals to user processes, etc.

The kernel 110 and the VMs 115, 120, and 125 execute on host hardware 105, which can comprise the physical hardware included in the computer system 100. Host hardware 105 can include at least one or more processors and one or more memory devices, with the one or more memory devices storing program instructions which are executable by the one or more processors. In one embodiment, computer system 100 is part of a cloud computing environment. In other embodiments, computer system 100 can be utilized in other types of computing environments.

In one embodiment, the kernel 110 and VMs 115, 120, and 125 maintain a set of virtual machine control blocks (VMCBs) 112. A VMCB 112 can generally include a data structure stored in a storage area that is allocated for the corresponding application or vShim layer. In one embodiment, a VMCB 112 can include a page of memory, although other embodiments can use larger or smaller memory areas and/or can use storage on other media such as non-volatile storage. In one embodiment, a VMCB 112 can include the application's or vShim layer's processor state, which can be loaded into a processor in the host hardware 105 when the application or vShim layer is scheduled to execute and can be stored back to the VMCB 112 when the application or vShim layer exits. In one embodiment, there is one VMCB 112 for each VM 115, 120, and 125, and there is one VMCB 112 for each vShim layer 130, 140, and 150 of each VM 115, 120, and 125, respectively. While the VMCBs 112 are shown as part of the kernel 110 for illustration in FIG. 1, the VMCBs 112 can be stored in memory, processor registers, and/or on non-volatile media in the host hardware 105 in other embodiments.

In one embodiment, each vShim layer 130, 140, and 150 acts as a liaison between the kernel 110 and user applications 135, 145, and 165, respectively. It is noted that each of user applications 135, 145, and 165 is representative of any number and type of user applications. In one embodiment, the host hardware executes a VMRUN instruction with nested paging enabled to launch a user application or a vShim layer. It is noted that the "nested paging" can also be referred to as "two-level paging". In nested paging, there are two sets of page tables. A first set is managed by the VM and a second set is managed by kernel 110. In one embodiment, kernel 110 runs in hypervisor, ring-0 space, each user application runs in guest, ring-3 space, and each vShim layer resides in guest, ring-0 space.

A typical operating system segregates virtual memory into kernel space and user space. This separation can provide memory protection that protects data from faults and malicious behavior. Kernel space is reserved for running a privileged operating system kernel, kernel extensions, and most device drivers. User space is the memory area where application software executes. In the prior art, the kernel 110 typically had complete access to the user space. However, if a flaw in the kernel 110 is exploited, user data can potentially be compromised. Accordingly, in one embodiment, kernel requests that target user space are required to pass through a vShim layer 130, 140, or 150, allowing the vShim layer 130, 140, or 150 to protect user data from unauthorized kernel accesses.

In one embodiment, encryption is utilized to secure both the vShim layer as well as the user process. In one embodiment, encryption can be implemented using Secure Encrypted Virtualization (SEV) from Advanced Micro Devices (AMD). In other embodiments, encryption can be implemented using other mechanisms. In one embodiment, kernel-to-user memory requests go through the vShim to enhance security of each guest from vulnerabilities in kernel 110 which could potentially be exploited.

Generally speaking, the role of the vShim layer is to be the liaison between kernel space and user space. When user space data is encrypted, the kernel is unable to directly decrypt the data. In one embodiment, all user access functions (e.g., copying from a user, copying to a user) are implemented in the vShim layer which is the only entity with full access to both user (encrypted) and kernel (unencrypted) space. Consequently the vShim layer can be used to filter accesses and block kernel access to specific regions. The vShim layer is also used to block user access to kernel space.

In one embodiment, there is a unique vShim layer per user process and potentially a unique encryption key as well. It is also possible for multiple user processes to share the same key to reduce pressure on the key space. In one embodiment, each vShim layer maintains its own set of page tables but does not perform memory management tasks such as free list management, swapping, etc. These functions can be performed by kernel 110. In the VPI architecture, it is possible for user processes to share libraries if the same memory encryption key is used by both processes. For instance, a system can use 5 encryption keys for 5 different groups of applications, in which case the system would also maintain 5 copies of shared libraries.

For the kernel to run or resume a user-space application, the kernel resumes the application's VM using the VMCB of the application. If the application requests a kernel service (e.g., a system call), the request can be trapped by the vShim layer before the VM is suspended and then the kernel handles the request. Depending on the embodiment, the vShim layer can utilize any of various techniques for invoking kernel services. In one embodiment, the vShim layer can invoke kernel services by using a ring-0 only instruction to request kernel assistance.

The vShim layer can invoke the kernel directly for services when needed. For example, the vShim layer can invoke the kernel for tasks like memory allocation and pinning. In one embodiment, the vShim layer does not manage memory allocation for the system, and memory allocation requests are processed by the kernel. In one embodiment, the 'RSM' instruction is used by the vShim layer to perform a hypercall into the kernel in a similar manner to the VMMCALL instruction.

A fork operation is an operation used by a process to create a copy of itself. In the VPI architecture, during a fork operation, the VMCB and vShim page tables are copied to the new thread so that the new thread shares the same address space as its parent thread. An exec operation is an operation for running an executable file. During an exec operation, the address space is reset. The vShim page tables are wiped out and new memory accesses cause a page fault in the vShim layer. As used herein, the term "page fault" is defined as the sequence of events occurring when the page tables do not have a valid mapping for a page targeted by a memory request.

The VPI architecture can be used to enhance system security in several areas. These features for enhancing security typically do not require code changes or recompilation of user application code. An advantage of the VPI architecture is that trust resides in the vShim layer, which is smaller than the kernel and thus easier to secure. In a system based on the VPI architecture, traditional memory scanners cannot be used to steal user program data because of the encryption used. In particular, reading "/dev/mem", unauthorized device direct memory access (DMA), and cold boot attacks would all be blocked from reading or modifying user data. Since kernel accesses to user-space go through the vShim layer, the vShim layer has the opportunity to filter and block clearly malicious accesses. For instance, the vShim layer can protect the guest instruction stream from kernel modifications.

In one embodiment, the vShim layer can be used to enforce that only pre-approved code runs in a particular key domain. This could be particularly useful for systems that mix highly sensitive applications with lower privileged ones. For instance, a trusted entity could supply the vShim with secure hash algorithm (SHA) hashes of all code that is allowed in the highly sensitive domain. When new code pages fault-in on demand into the vShim layer, the vShim layer compares the hash of the new page to the list of approved code hashes and only allows the new page if a match is found. This can ensure that only trusted code is run in that domain. In this embodiment, a unique key can be assigned to the highly sensitive application domain. This can prevent other applications or the kernel from accessing these memory pages. The vShim layer can then enforce that only approved code runs in this domain.

Certain applications have a need for highly secure memory to store things like encryption keys, passwords, account information, etc. Those applications (or the libraries they use) could be modified to inform the vShim layer about the highly secure memory being allocated. The vShim layer can then enforce that no vShim services are invoked by the kernel which reference this memory region. In one embodiment, the vShim layer can prevent the kernel from accessing this memory region by changing the protections for the memory page(s) of this region. In one embodiment, this type of private memory can protect data from being exposed even if the kernel on the machine was compromised. In another embodiment, the vShim layer can assist with secure attestation without requiring trust in the kernel by protecting memory needed to hold measurements. For example, the vShim layer has the ability to see and therefore measure (i.e., hash) the code or data loaded for a particular application. Accordingly, the vShim layer can be used to measure programs and provide a cryptographic secret if the program matches. If a program has been modified without authorization, the hash of the program generated by the vShim layer will not match the previously stored hash, and the vShim layer can deny access to the cryptographic secret.

For instance, in one embodiment, a password manager program can be written so that the password vault is protected with a master encryption key. That key would not be stored anywhere on non-volatile memory (e.g., disk), and could only be derived by decrypting a value stored on non-volatile memory with the measurements taken by the vShim layer. This type of architecture could ensure that only the password manager program could decrypt the password vault, and the decryption would fail if the program was run with any modifications.

The host hardware 105 generally includes all of the hardware of the computer system 100. In various embodiments, the host hardware 105 can include one or more processors, memory devices, peripheral devices, storage devices, and other circuitry used to connect together the preceding components. For example, personal computer (PC)-style systems can include a Northbridge coupling the processors, the memory, and a graphics device that uses an interconnect such as a peripheral component interconnect express (PCIe) based interface. Additionally, the Northbridge can connect to a peripheral bus such as a PCI bus, to which various peripheral components can be directly or indirectly coupled. A Southbridge can also be included, coupled to the PCI bus, to provide legacy functionality and/or to couple to legacy hardware. In other embodiments, other circuitry can be used to link various hardware components. For example, HyperTransport™ (HT) links can be used to link nodes, each of which can include one or more processors, a host bridge, and a memory controller. Each node can also include a Northbridge. The host bridge can be used to couple, via HT links, to peripheral devices in a daisy chain fashion. Alternatively, many of the components can be included on a single device such as, for example, a single device that integrates one or more processors, Northbridge functionality and a graphics device. Any desired circuitry/host hardware structure can be used.

In one embodiment, kernel 110 can use nested page tables to control access to the host physical address space. The nested page tables can receive the guest physical address as an input and map to the host physical address. Using the nested page tables for each VM 115, 120, and 125, kernel 110 can ensure that users do not access other users' physical memory in the host hardware 105. Each vShim layer 130, 140, and 150 can also manage a separate set of page tables from process virtual address to process physical address. In one embodiment, the vShim layer page tables include a mirror region to map a portion of user space into the kernel space of kernel 110. Accordingly, the vShim layer is able to access both user space and kernel space. In one embodiment, the system virtual memory is separated into kernel space and user space. User space is utilized as the virtual memory region for running user applications, while the kernel space is reserved for running the kernel and extensions to the kernel.

Figure 2:
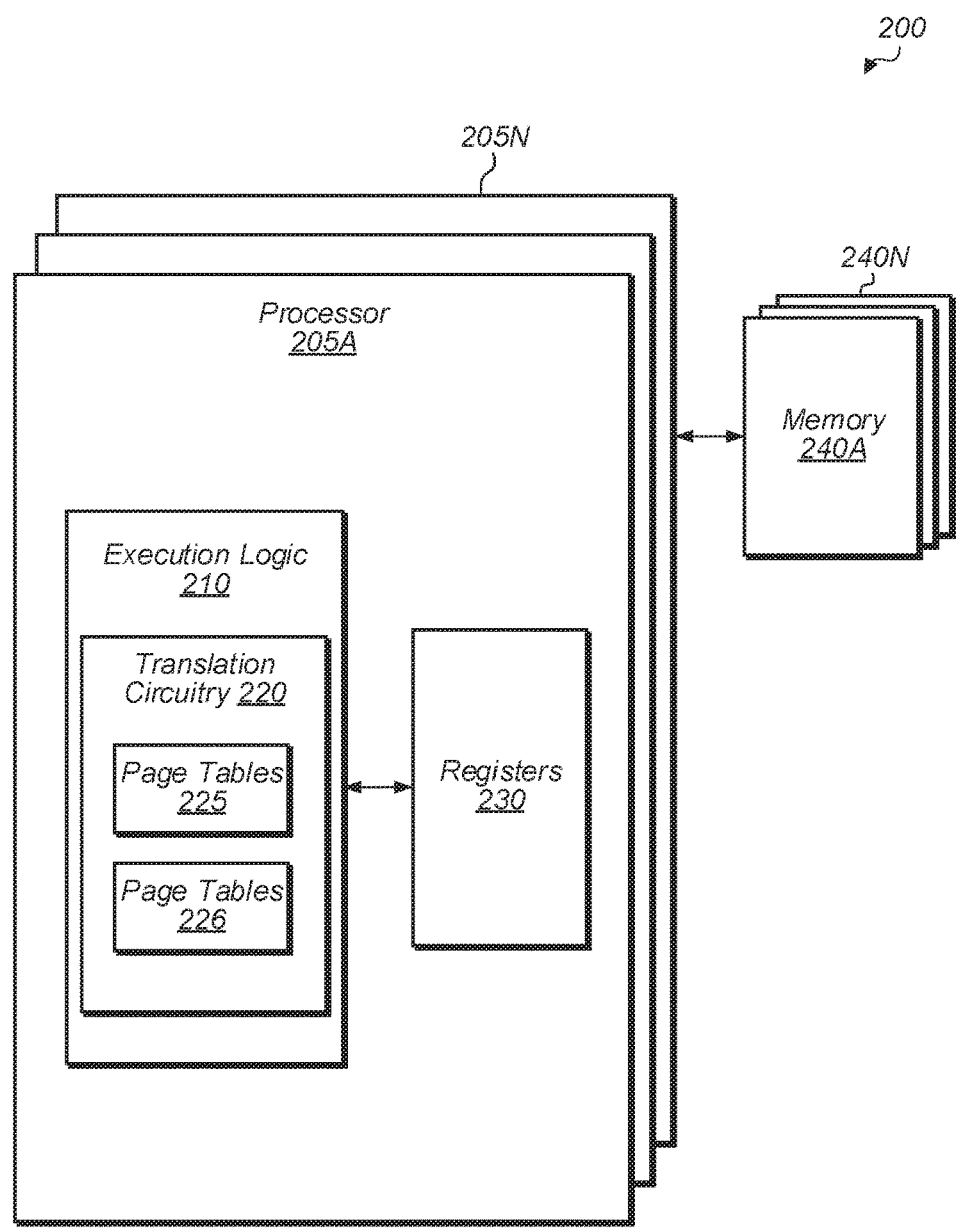
FIG. 2 is a block diagram of one embodiment of host hardware.

Turning now to FIG. 2, a block diagram of one embodiment of host hardware 200 is shown. In one embodiment, host hardware 200 can be implemented as the host hardware 105 (of FIG. 1). In the illustrated embodiment, host hardware 200 includes processors 205A-N coupled to memories 240A-N. Processors 205A-N are representative of any number and type of processing units and memories 240A-N are representative of any number and type of memory devices. Each processor 205A-N can include execution logic 210 and registers 230. Execution logic 210 can include any number and type of execution units and registers 230 can include architectural registers that are visible to the software and/or are specified by instructions to identify operands. In one embodiment, registers 230 can include a VMCB address register, a host save register, a register file, a set of segment registers, a set of control registers, a set of model specific registers (MSRs), a set of virtual machine (VM) registers, and a set of debug registers. In other embodiments, registers 230 can include other numbers and types of registers.

Generally, the execution logic 210 is configured to execute the instructions defined in the instruction set architecture implemented by the processors 205A-N (e.g., the x86 instruction set architecture, including AMD64™ extensions, in some embodiments). The execution logic 210 can employ any construction and can include any number of execution units (e.g., processor cores). For example, the execution logic 210 can include a super-pipelined core, a superscalar core, or a combination thereof in various embodiments. Alternatively, the execution logic 210 can include a scalar core, a pipelined core, a non-pipelined core, etc. The execution logic 210 can employ out of order speculative execution or in-order execution in various embodiments. The execution logic 210 can include microcoding for one or more instructions or other functions, in combination with any of the above constructions. The execution logic 210 can also include translation circuitry 220 that performs address translation according to an address translation mechanism defined for the processor 200. In one embodiment, the address translation mechanism can include nested paging to support guests. In nested paging, a vShim layer (e.g., vShim layer 130, 140, or 150 of FIG. 1) can support a set of page tables for each guest (translating from guest virtual to guest physical addresses) and a kernel (e.g., kernel 110) can support another set of page tables (translating from guest physical to host physical addresses). Thus, a tablewalk initiated during guest execution can walk two sets of page tables 225 and 226 when nested paging is used.

In one embodiment, the translation circuitry 220 can include a translation lookaside buffer (TLB) configured to cache the results of translations. The TLB can store the portion of the input address that gets translated (guest virtual or guest physical) and the corresponding portion of the resulting translated address (host physical). The portion can be the input/output address with the exception of the least significant bits that form an offset within the page. The page is the unit of translation, and can vary in size. Accordingly, it should be understood that the terms "page" and "memory page" are intended to represent any size of memory region.

In one embodiment, when executing a VMRUN instruction, the execution logic 210 can save the address of the VMCB identified by the VMRUN instruction in a VMCB address register of registers 230. Subsequently, during a guest exit, the execution logic 210 can save the processor state (or a portion thereof) to the VMCB indicated by the VMCB address register. In one embodiment, a host save register of registers 230 can store an address of a host save area in which a host processor state (e.g., corresponding to the kernel 110) can be saved. The execution logic 210 can save VMEXIT processor state in the host save area during execution of the VMRUN instruction, and can load VMEXIT processor state from the host save area during a guest exit to the kernel 110. In one embodiment, processors 205A-N can perform a VMEXIT instruction to exit from a guest to the host context.

As used herein, the term register refers to any storage location implemented in the processor that is addressable (or otherwise accessible) using an instruction. Registers can be implemented in various fashions. For example, registers can be implemented as any sort of clocked storage devices such as flops, latches, etc. Registers can also be implemented as memory arrays, where a register address is used to select an entry in the array. The registers 230 can be implemented in such a fashion, in some embodiments. Any combination of implementations can be used in various embodiments of host hardware 200. The various registers 230 can be part of the processor state in one embodiment.

Figure 3:
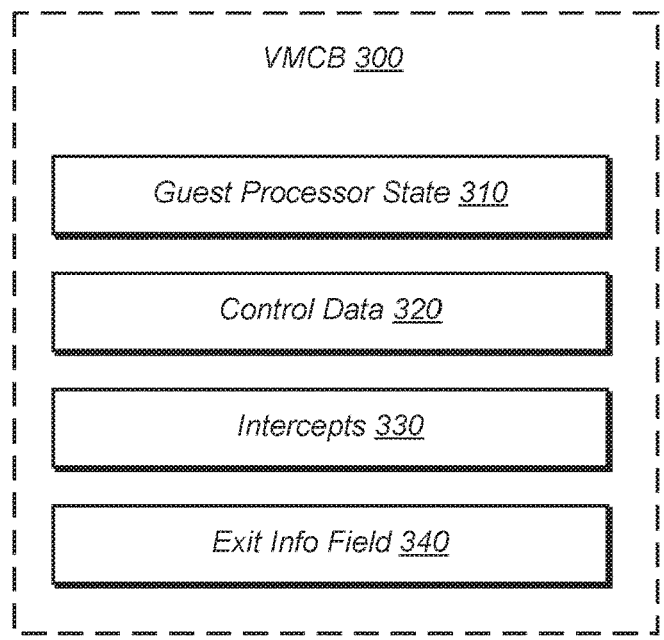
FIG. 3 is a block diagram of one embodiment of a virtual machine control block (VMCB).

Referring now to FIG. 3, a block diagram of one embodiment of a VMCB 300 is shown. In one embodiment, the contents of VMCB 300 can be included within each of the VMCBs 112 of FIG. 1. As shown in FIG. 3, the VMCB 300 includes a guest processor state 310, control data 320, intercepts 330, and exit info field 340. It is noted that in other embodiments, VMCB 300 can include other data fields. The guest processor state 310 can include an architected state that corresponds to the processor state at the point at which the guest last exited. When the VMCB 300 corresponds to a vShim layer, the guest processor state 310 can be configured before calling a service in the vShim layer. It is noted that the term "guest" as used to describe the various components of VMCB 300 can refer to a guest application or to a vShim layer, depending on the type of VMCB 300.

The guest processor state 310 can also include an implementation-specific state (e.g., model specific registers). For example, the guest processor state 310 can include an implementation-specific state and/or architected state that is considered part of the processor's context. The guest processor state 310 can correspond to an initial state of the processor if the guest has not yet executed. The processors 205A-N (of FIG. 2) can load the state of the processors 205A-N from the guest processor state 310 during execution of the VMRUN instruction. The processors 205A-N can save the state from the processors 205A-N to the guest processor state 310 during the guest exit. In one embodiment, the guest processor state 310 can be defined to store all of the processor state, while in other embodiments, the guest processor state 310 can be defined to store a portion of the processor state. Processor state not stored in the guest processor state 310 can be saved by a VMM in other memory locations (or can be recreated by the VMM). Any subset of the processor state can be included in the guest processor state 310. In various embodiments, the guest processor state 310 can be encrypted to prevent unauthorized access by the VMM and/or other guests.

The control data 320 can include any desired control information to be used when execution of the corresponding guest is initiated or exited. The control data 320 can include a guest exit code written by the processors 205A-N upon guest exit to indicate the reason for guest exit. The intercepts 330 can specify which events are enabled for fault or trap. The intercepts 330 can define exits to the VMM, using the VMEXIT mechanism. Various intercepts can be defined in various embodiments. In one embodiment, at least some of the intercepts can be defined as intercept indications in the intercepts 330. Each indication can, e.g., be a bit which enables the intercept when set or disables the intercept when clear. Other embodiments can assign the opposite meanings to the states of the bit or use other indications. There can be one intercept indication in the intercepts 330 for each intercept event.

Typically, operating systems use data structures to track information about processes and/or threads in the system. In one embodiment, these data structures can be expanded to include new information that is used for the VPI architecture. As an example, for each process, this new information can include pointers to two VMCB structures. The first VMCB structure is used to run code of the process and the second VMCB structure is used to invoke shim services.

Figure 4:
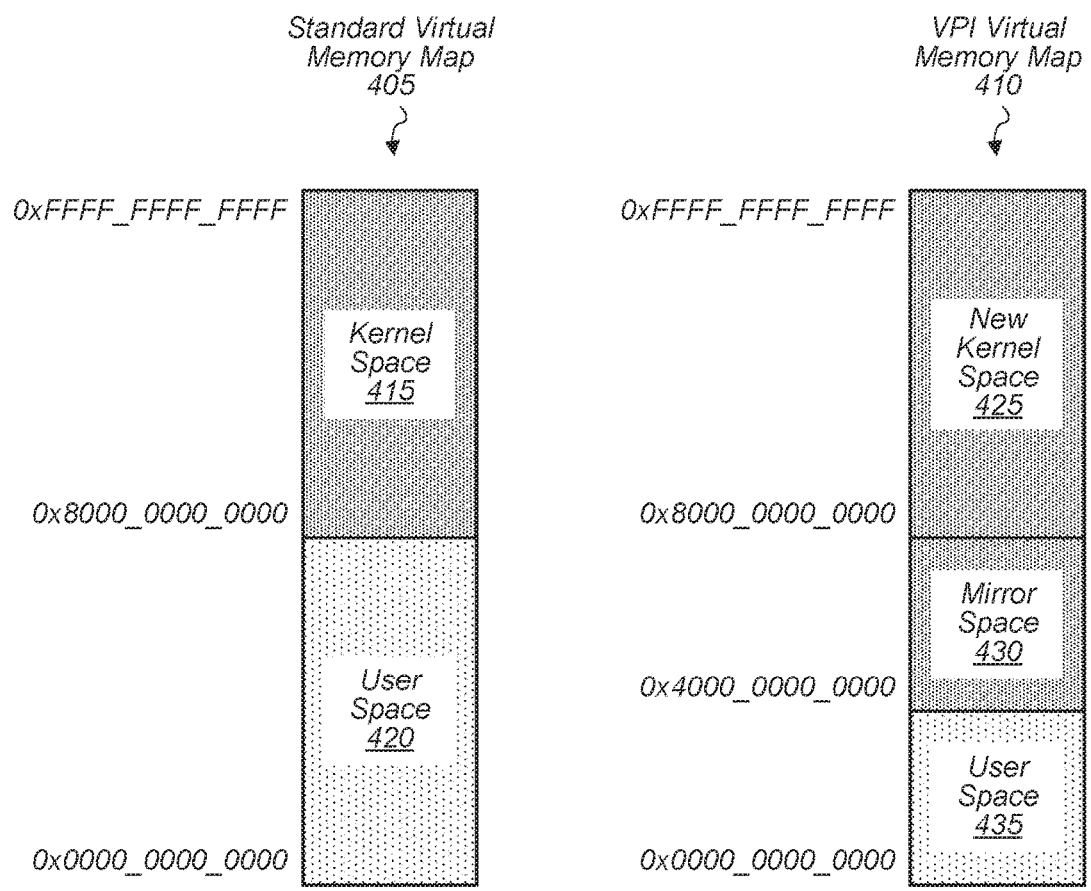
FIG. 4 illustrates two diagrams of virtual memory maps in accordance with one embodiment.

Referring now to FIG. 4, two diagrams of virtual memory maps are shown. A typical operating system segregates virtual memory into kernel space 415 and user space 420 as shown in standard virtual memory map 405 on the left-side of FIG. 4. This separation can provide memory protection that protects data from faults and malicious behavior. Kernel space 415 is the upper half of standard virtual memory map 405 while user space 420 is the lower half of standard virtual memory map 405. Kernel space 415 is reserved for running a privileged operating system kernel, kernel extensions, and most device drivers. User space 420 is the memory area where application software executes. In one embodiment, the techniques disclosed herein are utilized in a Linux® operating system environment. In the standard 64-bit Linux® architecture, user space consists of all virtual addresses where address bit [47]="0", while kernel addresses have address bit [47]="1". The virtual addresses are then mapped to the physical address space by the kernel via the process page tables.

Virtualized process isolation (VPI) virtual memory map 410 is shown on the right-side of FIG. 4 for use with embodiments based on the VPI architecture. In the VPI architecture, the upper address bit is used to indicate the encryption status of memory and so the user address space is reduced by a single bit, as compared to the standard Linux® architecture, with user-space 435 consisting of memory where address bits [47:46]="00". Kernel space 425 consists of memory where address bit [47]="1". The reduction in user-space creates a new virtual address space hole at mirror space 430 where address bits [47:46]="01". In one embodiment, mirror space 430 is used to mirror particular regions from the kernel space 425. Addresses in mirror space 430 point to the same physical pages and use the same intermediate page tables as the corresponding addresses in the kernel region.

In one embodiment, the guest physical address that comes out of the guest page tables is only 47 bits since the 48$^{th}$ bit indicates if the page was encrypted. The mirror space 430 is used exclusively by the vShim layer to manage the reduction in the physical address space. The mirror space 430 allows the vShim layer to address kernel memory. For example, when the vShim layer references a kernel address (say 0x8800_0000_0000), this is mapped by the vShim page tables to the mirror space 430 (at address 0x4000_0000_0000). This in turn is mapped by the kernel page tables (i.e., nested page tables) to the appropriate location (in this case, physical page 0).

In embodiments utilizing the VPI architecture, accesses by the user process or the vShim layer first go through the vShim page table. In one embodiment, the vShim page table is an identity map used for mapping user-space addresses. For kernel space, the vShim page table maps regions to the appropriate mirror region. Additionally, the vShim layer controls the C-bit for each page, with the C-bit indicating if the page should be encrypted or not. In one embodiment, the C-bit is address bit 47. However, it is noted that in other embodiments, other mechanisms for indicating if encryption is enabled can be utilized. Accordingly, the term "C-bit" can also be referred to as an "encryption bit" or an "encryption indicator". In one embodiment, user space memory is marked as encrypted while kernel space memory is marked as unencrypted. In another embodiment, user space memory can be encrypted with a first encryption key and kernel space memory can be encrypted with a second encryption key different from the first encryption key.

Figure 5:
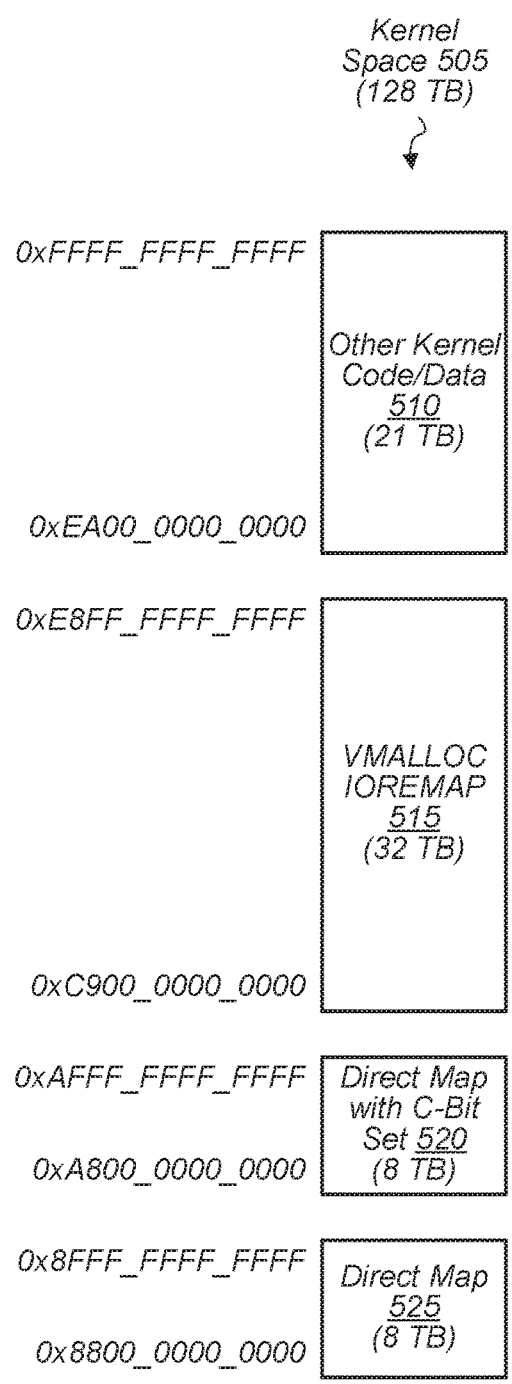
FIG. 5 is a diagram of one embodiment of a kernel space memory map.

Turning now to FIG. 5, a diagram of one embodiment of a memory map 505 of a kernel space is shown that illustrates a mapping or layout of a kernel space that generally corresponds to the kernel space 425 of FIG. 4. It is noted that kernel space memory map 505 is merely one example of a possible layout that can be utilized in one embodiment. In other embodiments, other layouts of kernel space are possible and are contemplated. In one embodiment, the kernel space has a total of 128 terabytes (TBs) of addressable memory space as shown in kernel space memory map 505. Other kernel code/data region 510 is shown at the top of the kernel space memory map 505. Next, the vmalloc ioremap region 515 is shown below the other kernel/code data region 510. Additionally, the direct map region, with C-bit set, 520 has been made smaller in the kernel space memory map 505, and a second direct map region 525 has been added so that all memory can be addressed with either setting of the C-bit.

Figure 6:
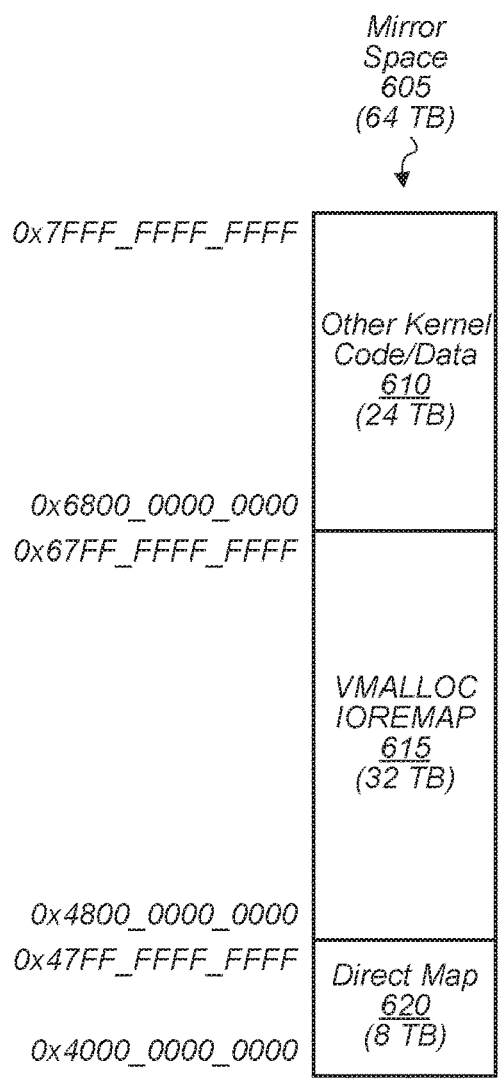
FIG. 6 is a diagram of one embodiment of a mirror space memory map.

Referring now to FIG. 6, a diagram of one embodiment of a memory map 605 of a mirror space that generally corresponds to the mirror space 430 of FIG. 4 is shown. In one embodiment, the mirror space is located within the user space where address bits [47:46]="01". The mirror space mapping is used by a vShim layer to mirror particular regions from the kernel space. As shown in FIG. 6, the mirror space includes other kernel code/data region 610, vmalloc ioremap region 615, and direct map region 620. In one embodiment, addresses in the mirror space point to the same physical pages and use the same intermediate page tables as the corresponding addresses in the kernel region.

In one embodiment, the guest physical address that is retrieved from the vShim page tables is only 47-bits since bit 48 indicates if the page is encrypted. In this embodiment, mirror space 605 allows the vShim layer to address kernel memory when there is one fewer bit in the guest physical address. For instance, when the vShim references a kernel address (at 0x8800_0000_0000), that address is mapped by the vShim page tables to the mirror region (at address 0x4000_0000_0000). This is in turn mapped by the kernel page tables (i.e., nested page tables) to the appropriate location (in this case, physical page 0).

Figure 7:
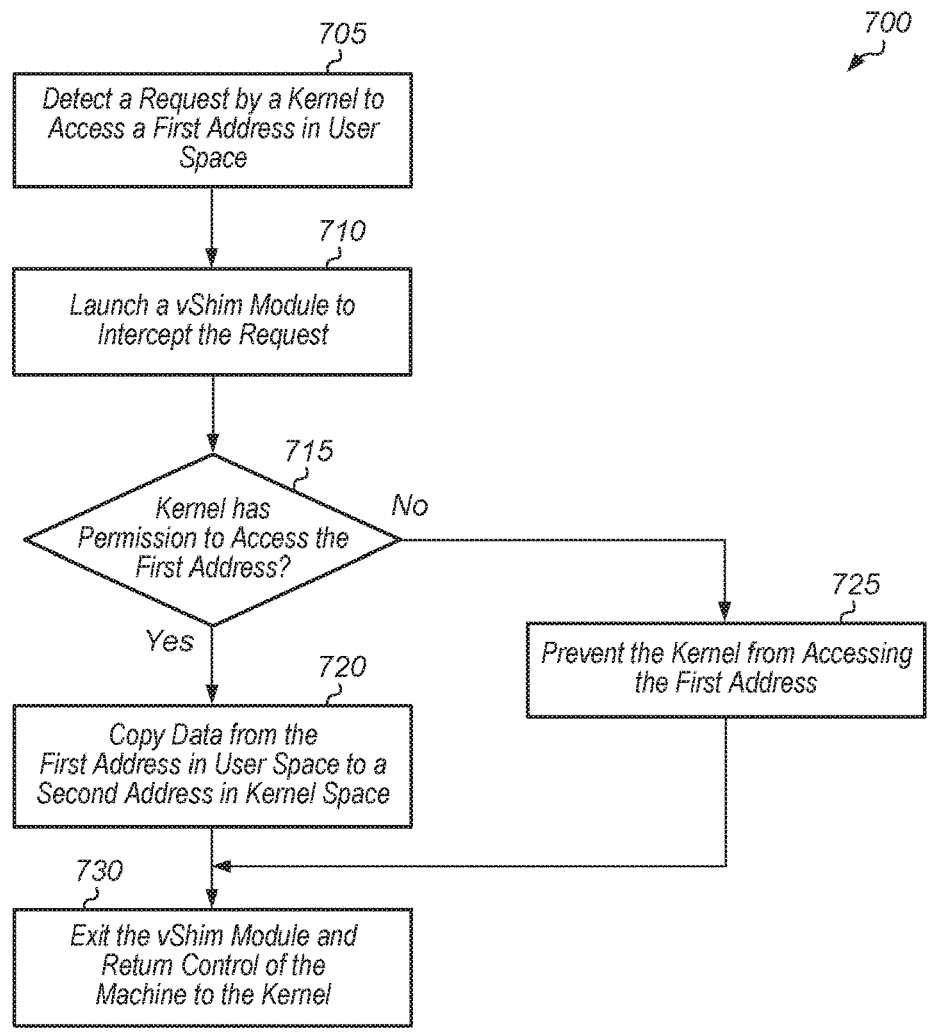
FIG. 7 is a generalized flow diagram illustrating one embodiment of a method for implementing a virtualized process isolation (VPI) architecture.
Figure 8:
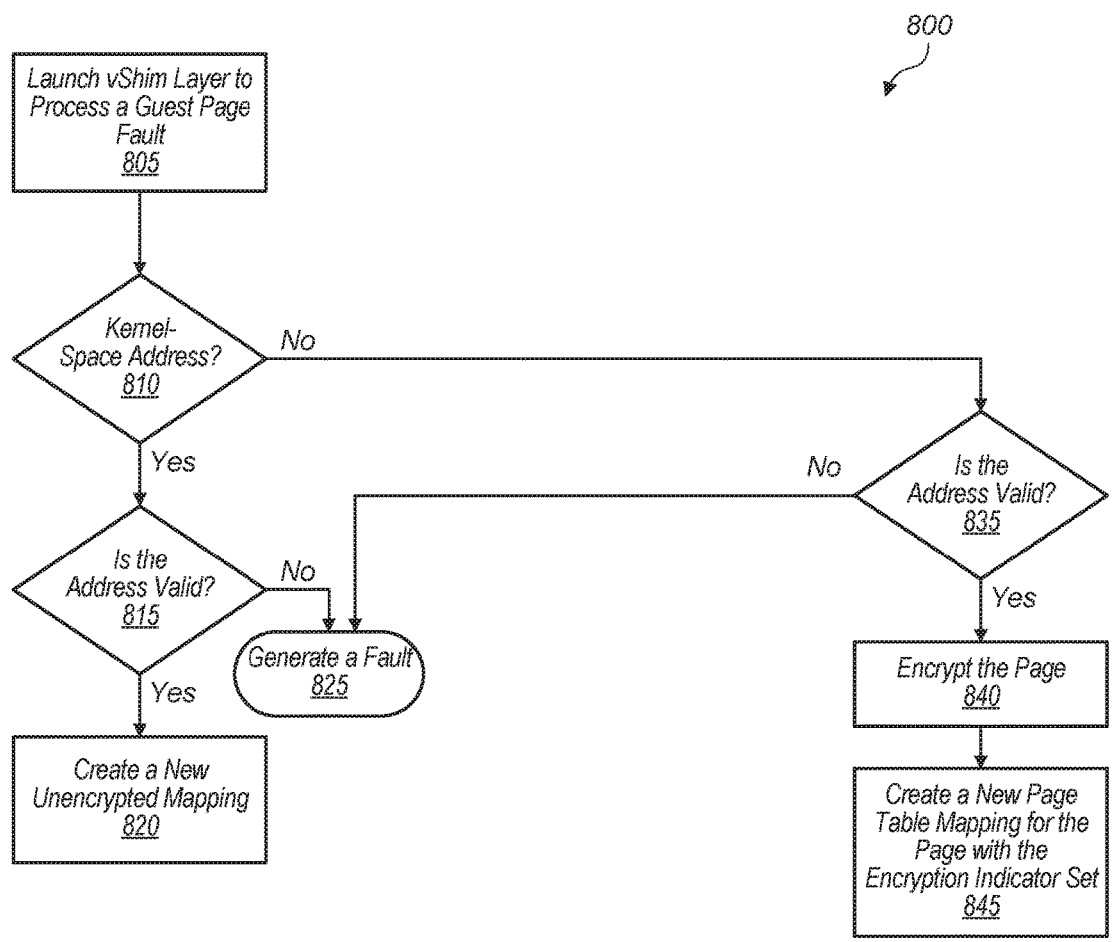
FIG. 8 is a generalized flow diagram illustrating one embodiment of a method for processing a guest page fault.
Figure 9:
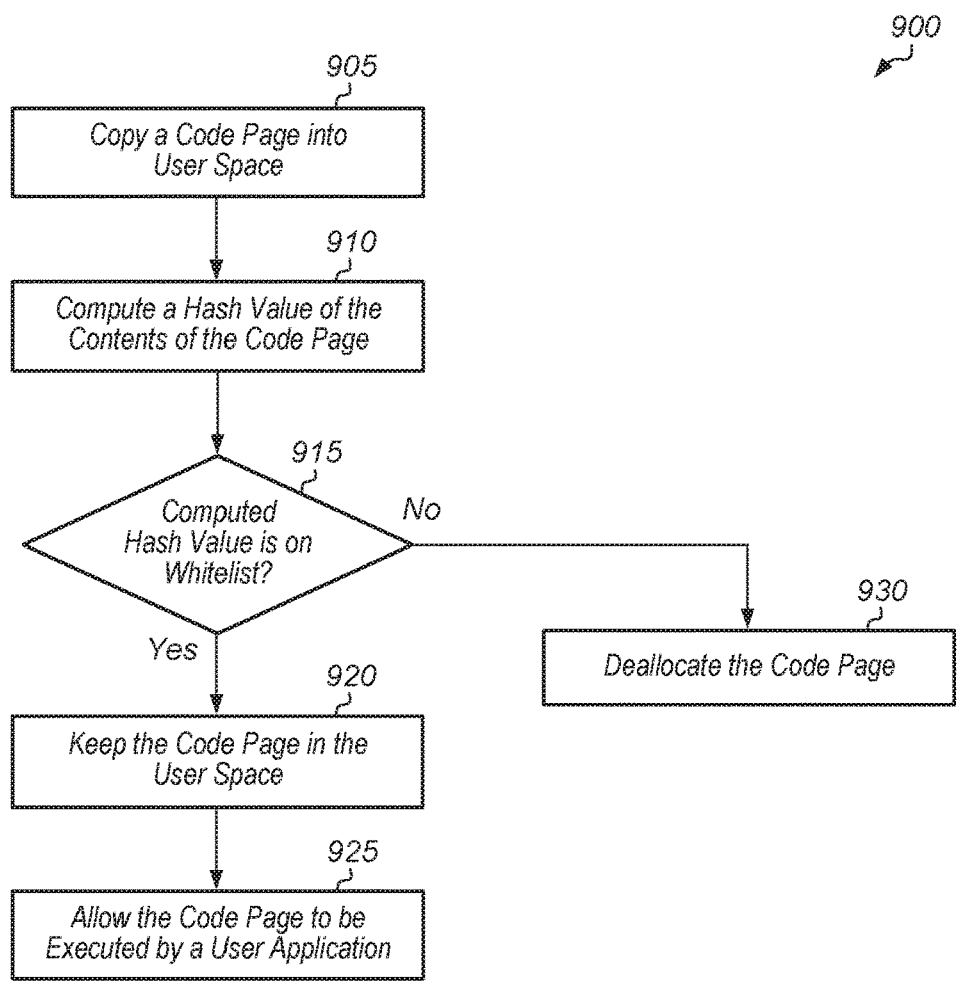
FIG. 9 is a generalized flow diagram illustrating one embodiment of a method for implementing security features in a vShim layer.
Figure 10:
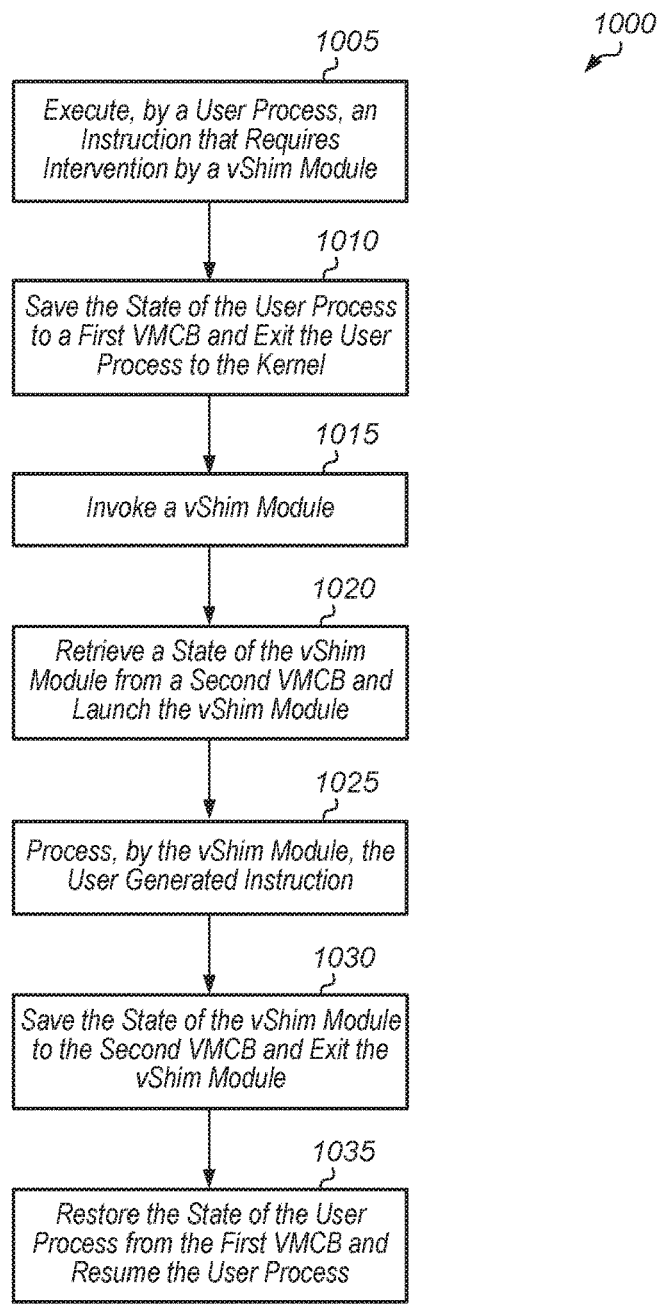
FIG. 10 is a generalized flow diagram illustrating one embodiment of a method for utilizing a vShim layer.

Referring now to FIG. 7, one embodiment of a method 700 for implementing a virtualized process isolation (VPI) architecture is shown. For purposes of discussion, the steps in this embodiment and those of FIGS. 8-10 are shown in sequential order. However, it is noted that in various embodiments of the described methods, one or more of the steps described are performed concurrently, in a different order than shown, or are omitted entirely. Other additional steps are also performed as desired. Any of the various systems or apparatuses described herein are configured to implement method 700.

A system detects a request by a kernel to access a first address in user space (block 705). Then, a vShim layer or module is launched to intercept the request (block 710). In one embodiment, the vShim layer runs in guest, ring-0 space.

Next, the vShim layer determines if the kernel has permission to access the first address in user space (conditional block 715). In one embodiment, the data stored at the first address is encrypted, and the only way for the kernel to access this data is through the vShim layer. In one embodiment, the vShim layer maintains a list of address ranges in user space that the kernel is allowed to access. Alternatively, in another embodiment, the vShim layer maintains a list of address ranges in user space that the kernel is not allowed to access.

If the kernel has permission to access the first address in user space (conditional block 715, "yes" leg), then the vShim layer or module copies data from the first address in user space to a second address in kernel space (block 720). If the kernel does not have permission to access the first address in user space (conditional block 715, "no" leg), then the vShim layer prevents the kernel from accessing the first address (block 725). In some embodiments, the vShim layer can also trigger a fault in block 725. After blocks 720 and 725, the vShim layer can exit and return control of the machine to the kernel (block 730). After block 730, method 700 ends.

Turning now to FIG. 8, one embodiment of a method 800 for processing a guest page fault is shown. In the example shown, a vShim layer is launched to process a guest page fault (block 805). If the address of the request is a kernel space address (conditional block 810, "yes" leg), then the vShim layer determines if the address is valid (conditional block 815). In one embodiment, determining if the address is valid can consist of determining if the address is in the vmalloc region, wherein the vmalloc region is an area that is reserved in the virtual address space between the variables "VMALLOC_START" and "VMALLOC_END".

If the address of the request is valid (conditional block 815, "yes" leg), then the vShim layer creates a new unencrypted mapping for the page (block 820). The new page table mapping corresponds to kernel space, which in one embodiment is considered shared (i.e., unencrypted). If the address is invalid (conditional block 815, "no" leg), then a fault is generated (block 825).

If the address of the request is a user space address (conditional block 810, "no" leg), then the vShim layer checks to see if the address of the request is valid (conditional block 835). If the address of the request is valid (conditional block 835, "yes" leg), then the vShim layer encrypts the page in memory (block 840). If the address of the request is invalid (conditional block 835, "no" leg), then the vShim layer generates a fault (block 825).

After block 840, the vShim layer creates a new page table mapping for the page with the encryption indicator set (block 845). In one embodiment, various security features can be implemented at this point in method 800. One example of a security feature which can be implemented is described in further detail below in the discussion regarding method 900 of FIG. 9. After blocks 820, 825, and 845, method 800 ends.

Referring now to FIG. 9, one embodiment of a method 900 for implementing security features in the vShim layer is shown. In the example shown, a code page is copied into the user space of memory (block 905). In one embodiment, the code page is copied into the user space of memory as a result of a guest page fault, with the guest page fault triggered in response to the code page being accessed for the first time. In one embodiment, the vShim layer detects the code page being copied into the user space based on the type of page fault generated, with the page fault indicating if the code page corresponds to an instruction fetch. In response to the code page being copied into the user space, the vShim layer computes a hash value (e.g., SHA hash) of the contents of the code page (block 910). In other embodiments, the vShim layer can use other types of functions to compute a uniquely identifiable value from the data of the code page. Then, the vShim layer checks if the computed hash value is on a whitelist of trusted code pages (conditional block 915).

If the computed hash value is on a whitelist of trusted code pages (conditional block 915, "yes" leg), then the vShim layer keeps the code page in the user space (block 920). Then, the code page is allowed to be executed by a user application (block 925). If the computed hash value is not on a whitelist of trusted code pages (conditional block 915, "no" leg), then the vShim layer deallocates the code page in the memory to prevent the code page from being executed by a user application (block 930). After blocks 925 and 930, method 900 ends.

Turning now to FIG. 10, one embodiment of a method 1000 for utilizing a vShim layer is shown. In the example shown, a user process executes an instruction that requires intervention by a vShim layer or module (block 1005). For example, in one embodiment, the user process can request access to a kernel resource via a system call in block 1005. In response to the instruction being executed, the state of the user process is saved to a first VMCB and then the user process exits to the kernel (block 1010). Next, the kernel invokes a vShim layer or module (block 1015). In response to the vShim layer or module being invoked, a state of the vShim layer or module is retrieved from a second VMCB and then the vShim layer or module is launched (block 1020). The second VMCB corresponds to the vShim layer, with the second VMCB being different from the first VMCB.

Next, the vShim layer or module processes the user generated instruction (block 1025). Then, the vShim layer or module saves its state to the second VMCB and the vShim layer or module exits (block 1030). Next, the user process restores its state from the first VMCB and then the user process is resumed (block 1035). Alternatively, control can be returned to the kernel and then to the user process in block 1035. After block 1035, method 1000 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
one or more processors configured to execute an operating system kernel, a monitoring layer separate from the operating system kernel, and one or more user processes; and
one or more memory devices configured to store the kernel, the monitoring layer, and the one or more user processes;
wherein the one or more processors are configured to:
detect a request by the kernel to access a first address in user space;
start execution of the monitoring layer to intercept the request;
responsive to determining the kernel does not have permission to access the first address, prevent, by the monitoring layer, the kernel from accessing the first address in user space;
responsive to determining the kernel has permission to access the first address:
copy, by the monitoring layer, data from the first address in user space to a second address in kernel space;
exit the monitoring layer; and
return control to the kernel, thereby allowing the kernel to access the data copied to the second address in the kernel space;
store a state of a guest virtual machine (VM) of the system to a first virtual machine control block (VMCB) within the system, responsive to exiting the guest VM; and
store a state of the monitoring layer to a second VMCB within the system responsive to exiting the monitoring layer.

2. The system as recited in claim 1, wherein the monitoring layer is configured to map the second address in kernel space to a mirror space address responsive to determining the kernel has permission to access the first address.

3. The system as recited in claim 2, wherein the mirror space address is located in user space.

4. The system as recited in claim 1, wherein the monitoring layer is configured to:
compute a uniquely identifiable value from data of a code page comprising program code responsive to the code page being copied into user space;
compare the uniquely identifiable value to a list of previously determined approved values corresponding to approved program code;
keep the code page in user space responsive to the uniquely identifiable value matching a value from the list; and
deallocate the code page responsive to determining the uniquely identifiable value is not on the list.

5. The system as recited in claim 1, wherein:
the second VMCB is different from the first VMCB; and
a user process of the guest VM includes a first pointer to the first VMCB and a second pointer to the second VMCB.

6. The system as recited in claim 1, wherein the kernel manages a first set of page tables and the monitoring layer manages a second set of page tables, and wherein the second set of page tables is an identity map for user space addresses while mapping kernel space addresses to a mirror space region.

7. The system as recited in claim 1, wherein the one or more processors are further configured to start execution of the monitoring layer in response to detecting a guest page fault.

8. A method comprising:
detecting a request by an operating system kernel to access a first address in user space;
responsive to determining the kernel does not have permission to access the first address, preventing, by a monitoring layer separate from the kernel, the kernel from accessing the first address in user space; and
responsive to determining the kernel has permission to access the first address:
copying data from the first address in user space to a second address in kernel space;
exiting the monitoring layer; and
returning control to the kernel, thereby allowing the kernel to access the data copied to the second address in the kernel space;
storing a state of a guest virtual machine (VM) of the system to a first virtual machine control block (VMCB) within the system responsive to exiting the guest VM; and
storing a state of the monitoring layer to a second VMCB within the system responsive to exiting the monitoring layer.

9. The method as recited in claim 8, wherein the method further comprises
mapping the second address in kernel space to a mirror space address in response to determining the kernel has permission to access the first address.

10. The method as recited in claim 8, wherein the mirror space address is located in user space.

11. The method as recited in claim 8, further comprising:
computing a uniquely identifiable value from data of a code page comprising program code responsive to the code page being copied into user space;
comparing the uniquely identifiable value to a list of previously determined approved values corresponding to approved program code;
keeping the code page in user space responsive to the uniquely identifiable value matching a value from the list; and
deallocating the code page responsive to determining the uniquely identifiable value is not on the list.

12. The method as recited in claim 8, wherein the second VMCB is different from the first VMCB, and wherein a user process of the guest VM includes a first pointer to the first VMCB and a second pointer to the second VMCB.

13. The method as recited in claim 8, further comprising:
managing, by the kernel, a first set of page tables; and
managing, by the monitoring layer, a second set of page tables, wherein the second set of page tables are an identity map for user space addresses while mapping kernel space addresses to a mirror space region.

14. The method as recited in claim 8, further comprising starting execution of the monitoring layer in response to detecting a guest page fault.

15. A non-transitory computer readable storage medium storing program instructions, wherein the program instructions are executable by a processor to:
detect a request by an operating system kernel to access a first address in user space;
start execution of a monitoring layer separate from the operating system kernel to intercept the request;
responsive to determining the kernel does not have permission to access the first address, prevent, by the monitoring layer, the kernel from accessing the first address in user space responsive to determining the kernel does not have permission to access the first address; and responsive to determining the kernel has permission to access the first address:

copy, by the monitoring layer, data from the first address in user space to a second address in kernel space;

exit the monitoring layer; and return control to the kernel, thereby allowing the kernel to access the data copied to the second address in the kernel space responsive to determining the kernel has permission to access the first address;

store a state of a guest virtual machine (VM) of the system to a first virtual machine control block (VMCB) within the system responsive to exiting the guest VM; and store a state of the monitoring layer to a second VMCB within the system responsive to exiting the monitoring layer.

16. The non-transitory computer readable storage medium as recited in claim 15, wherein the program instructions are further executable by the processor to cause the monitoring layer to map the second address in kernel space to a mirror space address in response to determining the kernel has permission to access the first address.

17. The non-transitory computer readable storage medium as recited in claim 15, wherein the mirror space address is located in user space.

18. The non-transitory computer readable storage medium as recited in claim 15, wherein the program instructions are further executable by the processor to:

compute a uniquely identifiable value from data of a code page comprising program code responsive to the code page being copied into user space;

compare the uniquely identifiable value to a list of previously determined approved values corresponding to approved program code;

keep the code page in user space responsive to the uniquely identifiable value matching a value from the list; and deallocate the code page responsive to determining the uniquely identifiable value is not on the list.

19. The non-transitory computer readable storage medium as recited in claim 15, wherein:

the second VMCB is different from the first VMCB and a user process of the guest VM includes a first pointer to the first VMCB and a second pointer to the second VMCB.

20. The non-transitory computer readable storage medium as recited in claim 15, wherein the program instructions are further executable by the processor to:

manage, by the kernel, a first set of page tables; and manage, by the monitoring layer, a second set of page tables, wherein the second set of page tables are an identity map for user space addresses while mapping kernel space addresses to a mirror space region.

* * * * *